3,816,591

PROCESS FOR THE RECOVERY OF ALUMINIUM AND FLUORINE FROM A DILUTE AQUEOUS SOLUTION

Alfred Schmidt, Linz (Danube), Austria, assignor to Osterreichische Stickstoffwerke Aktiengesellschaft, Linz (Danube), Austria No Drawing. Filed May 5, 1972, Ser. No. 250,820
Claims priority, application Austria, May 7, 1971, A 3,971/71
Int. Cl. C01b *9/08;* C01f *7/54*
U.S. Cl. 423—114 2 Claims

ABSTRACT OF THE DISCLOSURE

Process for the recovery of aluminium and fluorine values from dilute aqueous solutions containing aluminiumfluoride and silicofluoride whereby in said solution bound fluorine is present in excess with respect to aluminium by adding an ammoniacal medium in order to adjust the pH of said solution between 6 and 6.5 and separating the precipitated ammoniumfluoraluminate.

This invention relates to the recovery of aluminium and fluorine values from dilute aqueous solutions of aluminiumfluoride containing also silicofluoride particularly from mother liquors obtained from the crystallization of aluminium fluoride, formed by reaction of $$Al(OH)_3$$

with fluosilicic acid.

If aluminium fluoride trihydrate is manufactured by crystallization from its aqueous solutions, the mother liquor which remains contains a residue of about 2% by weight of aluminium fluoride. Further reduction of this content is no longer possible through a longer reaction time or by changing the temperature during the crystallization, so that considerable amounts of aluminium and fluoride are lost.

Apart from the aluminium fluoride, the mother liquors also still contain silicofluoride. If attempts are made to precipitate the aluminium as hydroxide by adding a caustic alkali solution, the coprecipitated silicic acid contaminates the aluminium hydroxide precipitate. This silicic acid is of a jelly-like consistency so that it is practically impossible to remove the precipitate by filtration. As a result of the hydrolysis, almost the entire fluorine content furthermore remains in the liquid phase and is therefore lost.

Surprisingly, it has now been found that the aluminium content of the mother liquor may be recovered practically completely if the pH value of the mother liquor which must contain an excess of bound fluorine with respect to the aluminium being present is adjusted, at a temperature between 15 and 35° C. to a certain pH range by adding ammonia, ammonium carbonate or ammonium bicarbonate. Hereupon, a crystalline substance precipitates, the composition of which approximately corresponds to the formula $(NH_4)_5Al_3F_{14}$, and which thus represents an ammonium compound approximately analogous to chiolite. It is contaminated with only small amounts of silicic acid (0.2 to 2.5% of $SiO_2$) and is easily filtrable.

Accordingly, the present invention provides a process for the recovery of aluminium and fluorine values from dilute aqueous solutions containing aluminiumfluoride and silicofluoride which comprises adding to said solution, which must contain fluorine besides the fluorine deriving from the aluminiumfluoride in an amount of at least 1 g./l. per g./l. of aluminium being present in said solution at a temperature of 15 to 35° C. whilst stirring an ammoniacal medium selected from the group consisting of gaseous ammonia, aqueous ammonia solution, ammonium carbonate and ammoniumbicarbonate in an amount that the pH of said solution is adjusted to at least 6 and 6,5 as a maximum and separating therefrom the solid ammonium fluoraluminate which is precipitated.

As a rule 4 to 6 kg. of gaseous ammonia or the corresponding amount of ammonium hydroxide, ammonium carbonate or ammonium bicarbonate are employed per 1 kg. of dissolved aluminium fluoride.

The residual content of aluminium fluoride in the precipitated solution is 0.15 to 0.25%, so that about 90% of the aluminium fluoride originally present in the mother liquor may be recovered in this way.

It is essential for the success of the process that the pH range according to the invention should be observed. If the pH is less than this, losses in yield result, whilst if it is greater the undesired $SiO_2$ content in the end product increases. The excess of fluorine, needed for the reaction may be present as silicofluoride or per example besides silicofluoride only as Al-fluoraluminate being obtained by a foregoing treatment of mother liquors in the herein described manner and added before crystallization.

The precipitated compounds may be used in various ways. If the compound is added to the hydrofluoric acid or fluosilicic acid used for the manufacture of aluminium fluoride, it dissolves therein and does not influence the subsequent process. When using fluosilicic acid, the addition also may be made only after the removal of the silicic acid, that is to say before or during the crystallization. In all cases, both the aluminium and the fluorine are reutilised.

The following Example illustrates the invention and the manner in which it may be performed.

Example 9 g. of $NH_3$ in the form of an ammonium carbonate solution containing 43% by weight of $(NH_4)_2CO_3$ were added at room temperature, with stirring, to 1,200 ml. of a mother liquor from the manufacture of aluminium fluoride, which contained 5.6 g./l. of Al, 20 g./l. of F and 1.55 g./l. of Si. The pH value was thereafter about 6.2. The resulting precipitate was filtered off after 10 minutes and dried. It weighed 36 g. The filtrate which remained contained 0.6 g./l. of Al. The composition of the precipitate was 19.4% of $NH_3$, 16.35% of Al and 56.4% of F. The yield was 87.5% relative to the aluminium and the $SiO_2$ content was about 0.5%.

What we claim is:

1. A process for the recovery of aluminium and fluorine values from a diluted aqueous mother liquor solution resulting from the production of $AlF_3 \cdot 3H_2O$ from $Al(OH)_3$ and $H_2(SiF_6)$, said diluted mother liquor solution containing up to about 2% of aluminium fluoride and also silica fluoride therein and which solution must contain fluorine other than the fluorine derived from aluminium fluoride in an amount of at least 1 g./l. per g./l. of aluminium present in said solution, said process consisting essentially of adding to said solution a material selected from the group consisting of gaseous ammonia, an aqueous ammonia solution, ammonium carbonate, and ammonium bicarbonate under stirring at a temperature of 15 to 35° C. in such amounts that the pH of said solution is adjusted to between about 6 and 6.5 to precipitate the solid ammonium fluoroaluminate having the approximate formula $(NH_4)_5Al_3F_{14}$ produced therefrom and separating the solid product from said solution.

2. A process according to claim 1, in which the pH of the aqueous solution is adjusted to a value of 6.1 to 6.3.

References Cited

UNITED STATES PATENTS

| | | | |
|---|---|---|---|
| 1,511,561 | 10/1924 | Howard | 423—465 |
| 3,493,330 | 2/1970 | Vancil et al. | 423—116 |
| 3,493,331 | 2/1970 | Vancil et al. | 423—116 |
| 1,475,156 | 11/1923 | Howard | 423—465 |

FOREIGN PATENTS

| | | | |
|---|---|---|---|
| 635,552 | 4/1950 | Great Britain | 423—465 |

OSCAR R. VERTIZ, Primary Examiner

B. E. HEARN, Assistant Examiner

U.S. Cl. X.R.

423—464, 465